United States Patent [19]

Wagner et al.

[11] Patent Number: 4,685,988

[45] Date of Patent: Aug. 11, 1987

[54] BURIED MICROSTRIP NETWORK PROCESSING

[75] Inventors: Robert A. Wagner, Manchester; Peter K. Cheo, West Hartford, both of Conn.

[73] Assignee: United Technologies Corporation, Hartford, Conn.

[21] Appl. No.: 720,197

[22] Filed: Apr. 4, 1985

[51] Int. Cl.⁴ ............................................. G02B 5/14
[52] U.S. Cl. ............................. 156/250; 350/96.12; 350/96.13; 350/96.14
[58] Field of Search .......................... 156/250, 330; 350/96.12–96.15

[56] References Cited

U.S. PATENT DOCUMENTS 4,124,270 11/1978 Cheo ............................ 350/96.12
4,169,009 9/1979 Wagner ........................ 156/636
4,208,091 6/1980 Cheo ............................ 350/96.13

OTHER PUBLICATIONS

P. K. Cheo, *Frequency Synthesized and Continuously Tunable IR Laser Source in 9–11* μm, IEEE Journal of Quantum Electronics, vol. QE-20, No. 7, Jul. 1984.
P. K. Cheo, et al, *Infrared Electrooptic Waveguides,* IEEE Journal of Quantum Electronics, vol. QE-13, No. 4, Apr. 1977.
P. K. Cheo, et al, *Continuous Tuning of 12 GHz in Two Bands of $CO_2$ Laser Lines,* Optics Letters, vol. 1, No. 1, Jul. 1977.
P. K. Cheo, *Generation and Applications of 16 GHz Tunable Sidebands from a $CO_2$ Laser,* Laser Spectroscopy III, Edition by J. L. Hall and J. L. Carlsten, Springer Verlag, Berlin Heidelberg, New York, pp. 394–401, 1977.

*Primary Examiner*—David Simmons
*Attorney, Agent, or Firm*—J. Kevin Grogan

[57] ABSTRACT

A broadband infrared microwave modulator is fabricated with a thin film electro-optic waveguide mounted to a metal base substrate having a dielectric wafer buried therein to allow high power operation of the modulator.

13 Claims, 11 Drawing Figures

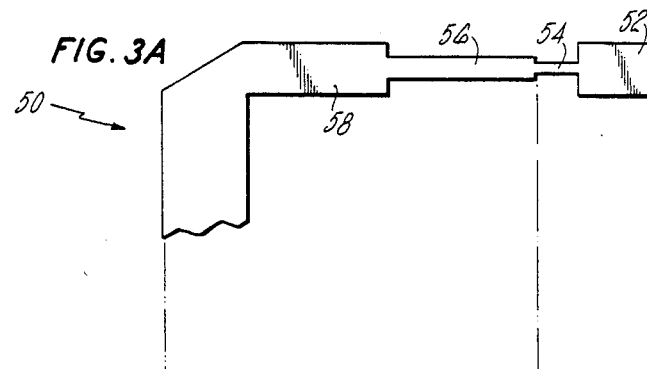
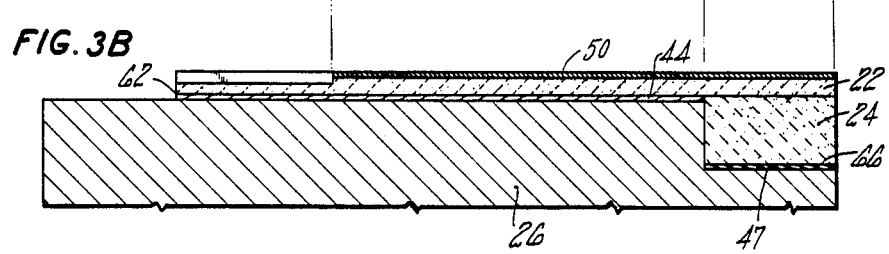
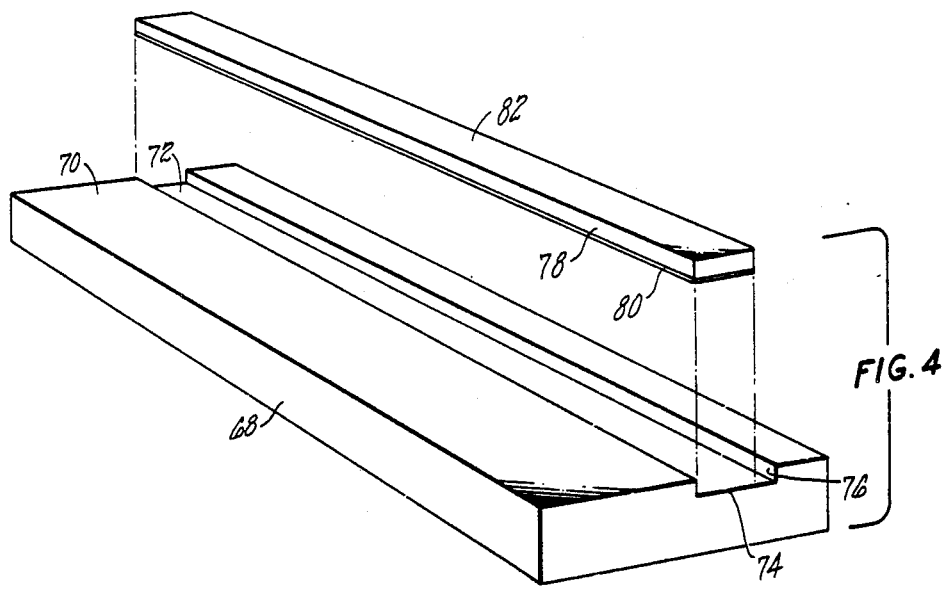

BURIED MICROSTRIP NETWORK PROCESSING

CROSS REFERENCE TO RELATED APPLICATIONS

The subject matter hereof is also disclosed, and some of it is claimed, in a commonly owned copending U.S. patent application filed on even date herewith by Peter K. Cheo et al, Ser. No. 720,112, entitled A BROADBAND INFRARED ELECTRO-OPTIC MODULATOR HAVING A BURIED MICROSTRIP NETWORK.

TECHNICAL FIELD

This invention relates to fabrication of electro-optical devices and more particularly to fabrication of electro-optical modulators for use with electro-optic processing of infrared laser signals.

BACKGROUND ART

Optical waveguides used to provide modulation of propagating infrared (IR) laser signals are well known in the art. These devices are employed in a variety of applied optical systems, such as optical imaging radar, high data rate communications and high resolution spectroscopy. These applications require laser signal processing to encode information on to the laser carrier and provide discrete optical control functions.

The signal processing of the laser beam is accomplished as the light passes through the optical waveguide. These waveguides comprise high resistivity, high refractive index materials such as chromium doped gallium arsenide (GaAs), either epitaxially grown to a desired thickness or chemomechanically fabricated from a larger crystal. A microwave signal is coupled into the device and the electro-optic properties of the waveguide material provide phase shift modulation of the guided infrared (IR) beam.

Modulation over a large band requires efficient interaction between the optical and microwave fields, and efficient coupling of these two waves into the waveguide. The phase velocity of the microwave and optical wavefronts are very nearly equal when proper synchronization has been achieved. Broadband signal processing also mandates increased laser input power and/or microwave modulating power of the processing signal source. With increasing power levels, the prior art optical waveguide devices suffer performance degradations from a variety of waveguide imperfections. Some, such as free carrier absorption and lattice mismatch, are pervasive to the waveguide material itself. Others can be associated with the fabrication of the waveguide. These include processing damage resulting in minute fractures or surface imperfections in the crystal and in thickness variations throughout the waveguide.

Bandwidth and frequency response of the prior art devices, including those devices fabricated as described in U.S. Pat. No. 4,169,009 entitled LARGE AREA MICROSTRUCTURES issued to Robert A. Wagner et al have been limited to below one GHz.

Thin film planar electro-optic modulators require dimensional accuracy of device structures to be maintained over two dimensions as well as providing uniform thickness in the active region. Device configurations described in the aforementioned Wagner patent, such as slot line and dielectrically filled ridge waveguides are extremely difficult to reproduce, as these devices bear the additional burden of providing dimensional uniformity for the height and/or depth of inter-device structures as well as maintaining precise control over the dimension ratio of these structures. Fabrication of these devices requires the use of noncontacting masking procedures, such as shadow masking. In addition these devices can make only limited use of highly accurate photolithographic techniques. The microstrip electrodes thereon possess non-coplanar and vertical sections.

The major difficulty in extending bandwidth and improving frequency response has come from the difficulty in fabricating these devices to the extremely close tolerances required, and in maintaining a reliable operation at high power levels.

DISCLOSURE OF INVENTION

An object of the present invention is to provide techniques for fabricating three dimensional microstrip structures for use in electro-optic devices. Another object of the present invention is to provide a process for fabrication of buried microstrip structures suitable for use in broadband infrared microwave modulators.

According to the present invention, a buried microstrip modulator fabrication process includes a thin film waveguide formed having selected width, length and thickness and first and second major surfaces, and a dielectric slab formed having a length at least as long as the waveguide length and initial thickness and width. The slab also includes first and second major surfaces with metal plated to the first major surface. In further accord with the present invention, a metal block is fabricated with a lengthwise channel positioned in an optically flat major surface. The channel has a bottom surface whose width is greater than the dielectric slab width and a depth less than the initial slab thickness that is chosen in dependence on the modulator's desired electrical characteristics. The dielectric slab is bonded in the channel such that the plated major surface abuts the channel bottom surface and the slab abuts the channel sidewall, to form an assembly.

In further accord with the present invention, the assembly is thinned until the second major slab surface is essentially coplanar with the block's optically flat surface forming a hybrid surface. The assembly is cut along a slab length substantially perpendicular to the optically flat surface to provide a substrate assembly having dielectric, wafer and metal base components thereof. The width of the wafer is chosen in dependence on the modulator's desired electrical characteristics.

In still further accord with the present invention, the waveguide is bonded on to the hybrid surface of the substrate assembly such that it is in registration with the wafer component of the hybrid surface. The waveguide surface which abuts the hybrid surface has a metal plated on to that portion of the surface that is in registration with the metal portion of the hybrid surface. On the second major waveguide surface is fabricated a microstrip network electrode and a ridge structure whose geometry and position is chosen in dependence on the modulator's desired electrical characteristics.

According to another aspect of the present invention, after bonding to the substrate assembly, the waveguide is thinned to a preselected thickness and uniformity.

According to still another aspect of the present invention, the step of thinning the waveguide further comprises the steps of iteratively measuring the thickness and uniformity of the waveguide.

BRIEF DESCRIPTION OF DRAWINGS

FIG. 3a is an elevated section of the modulator of FIG. 1 taken along the line 2—2, and 3b is an illustration of a portion of the network electrode thereon;

FIG. 4 is a perspective illustration of two elements used in the fabrication of the buried microstrip modulator of FIG. 1.

BEST MODE FOR CARRYING OUT THE INVENTION

Figure 1:
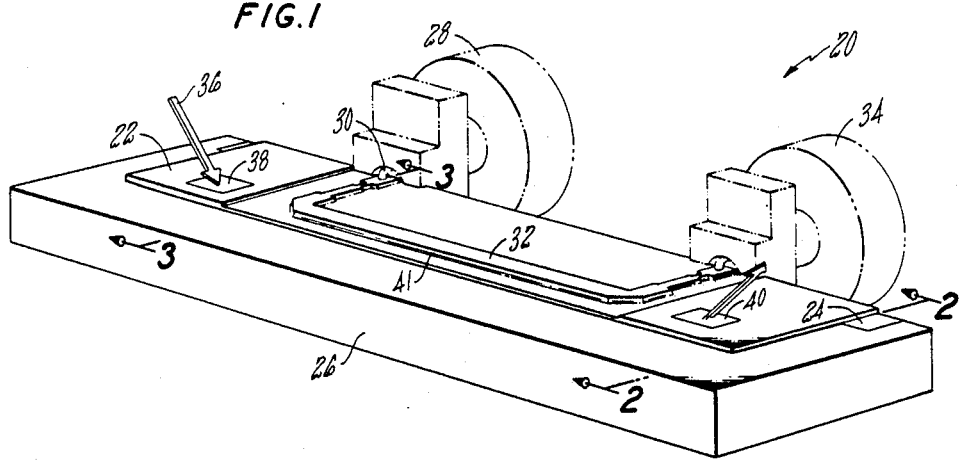
FIG. 1 is a perspective illustration of a buried microstrip infrared modulator provided through the fabrication process of the present invention.

Referring now to FIG. 1, a buried microstrip infrared modulator provided through a fabrication process according to the present invention comprises a buried microstrip modulator 20 which includes thin film waveguide 22, dielectric wafer 24 and metal base 26. The dimensions of the various components shown in FIG. 1 have been exaggerated for illustrative purposes and are not to scale.

A microwave signal generator, external to the modulator and not part of the present invention provides microwave signals to microwave terminal 28. The signal generator is conventional, and in the best mode comprises a frequency synthesizer with a high power, broadband traveling wave tube amplifier operating in the X and Ku bands. The microwave energy is launched through modified microstrip launcher 30 into the waveguide along microstrip network electrode 32 having linear portion 33. The launcher has a flat planar interface with the network.

The microwave energy establishes an electric field within the waveguide structure itself. The microwave induced electromagnetic field present in the portion of the waveguide underneath the network causes a local change in the index of refraction of the waveguide material. The microwave terminal 34 provides a return via launcher 35 to an appropriate signal termination for the microwave signals. Since microwave launchers 30 and 35 are of a broadband design and correctly terminated only a forward traveling wave will exist in the modulator. Those skilled in the art will note that the direction of propagation of the microwave and optical signals must be the same. If the direction of propagation of the optical signal is reversed in the modulator of FIG. 1, then the microwave signal source and return terminals must be reversed.

An optical signal 36 is provided from a coherent infrared source (not shown and not part of the present invention), such as a $CO_2$ or an equivalent laser, is coupled into and out of the device through the use of coupling prisms (not shown) that are located on optical regions 38 and 40. The preferred prism couplers may be right angled, germanium prisms of a type known in the art having a prism geometry selected to provide excitation of the lower order $TE_0$ and $TE_1$ optical propagation modes within the guide. As hereinafter detailed in FIG. 2, the geometry and thickness of the waveguide is chosen such that the propagation of the laser beam through the waveguide is limited to a guided mode.

The oscillating electric fields within the waveguide provide a periodic change in the index of refraction of the waveguide material and ultimately product phase shift modulation of the laser beam traversing through the waveguide. Phase shift modulation of a propagating $CO_2$ laser beam at microwave frequencies with linear polarization generates both upper and lower sideband frequencies which can subsequently be resolved from the laser signal. By varying the microwave frequency, it is possible to tune the sideband frequency of the optical signal over a finite range.

Efficient broadband modulation of the optical carrier requires both optimized synchronization between the traveling microwave and traveling optical wavefronts and lateral confinement of the optical signal to the intense microwave induced electric field. The microstrip structure of network electrode 32 is most effective, as it can be fabricated using photolithographic techniques well known in the art and produce electrodes of the desired accuracy. However, the use of such a microstrip network coupled with the required dimensions of the active region of the waveguide increases the difficulty of proper impedance matching.

Consequently, an effective step in the thickness of a portion of the waveguide is introduced in order to allow sufficiently rugged electrodes to be used. As hereinafter described in FIG. 2, dielectric wafer 24 which comprises a thin wafer of gallium arsenide (GaAs) in the best mode embodiment, is recessed into the metal block and is in registration with a first impedance transformer portion of the network.

The network electrode is located on ridge 41 fabricated by techniques known in the art on a surface of the waveguide. The difference in index of refraction presented by the air compared with the ridge is sufficient to confine the laser signal to the portion of the waveguide directly underneath the network electrode. In the best mode embodiment the ridge is formed by removing several microns of waveguide material adjacent to the portion of the network electrode which is colinear with direction of propagation of the laser signal.

Figure 2:
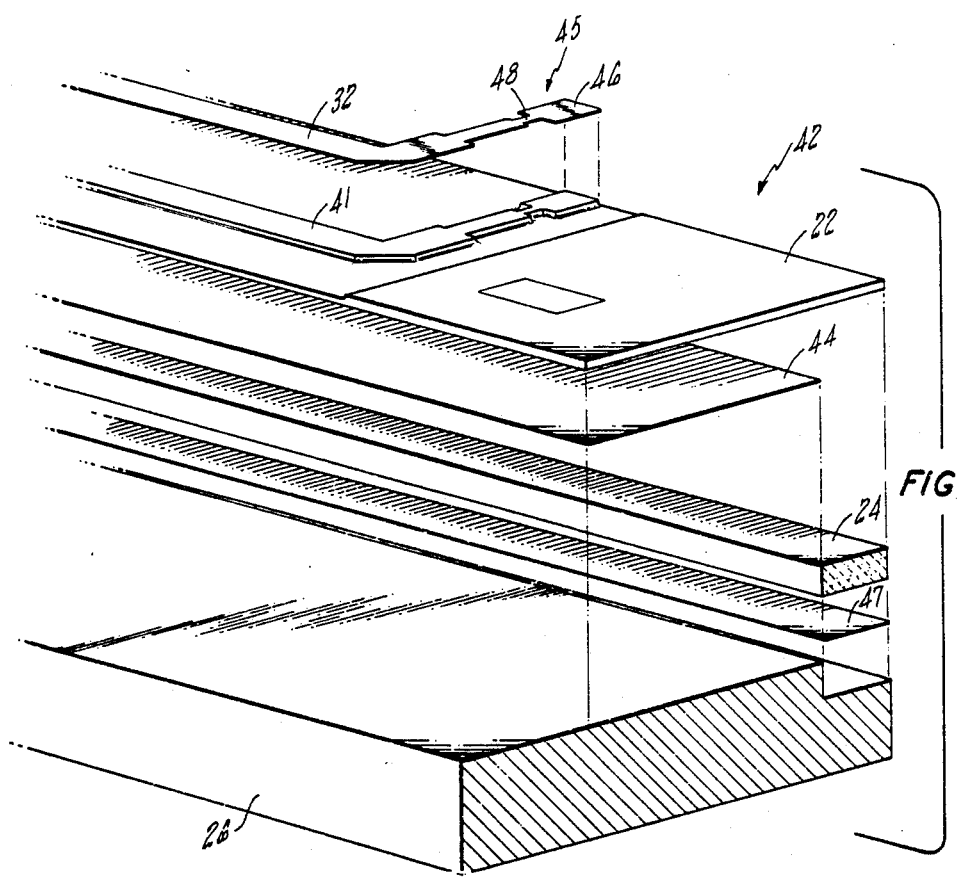
FIG. 2 is an exploded, perspective illustration of a portion of the buried microstrip modulator of FIG. 1.

FIG. 2 is another illustration, partially in section and partially in perspective, of an end section 42 of the buried microstrip infrared modulator of FIG. 1. As hereinbefore outlined, the microstrip modulator includes metal base 26, wave-guide 22 and dielectric wafer 24. In the best mode embodiment the metal base comprises a base formed from copper, although other metals, such as molybdenum may be substituted. Formed on the top surface of the waveguide is the microstrip network electrode comprising 5 microns of copper in the best mode embodiment fabricated according to conventional techniques with a geometry and position detailed hereinafter in FIG. 3. Those skilled in the art will recognize that other metals such as gold, aluminum or molybdenum may be substituted.

The material used to fabricate the waveguide may be any infrared, electro-optic material that is free from defects. Cadmium telluride (CdTe) and gallium arsenide (GaAS) are the two most commonly used, but those skilled in the art will recognize that other equivalent materials may be substituted. In the best mode embodiment, the waveguide is fabricated from a large area (3 inch × 3 inch) gallium arsenide wafer. The (001) crystallographic direction is selected to be prependicular to the electric field vector because this orientation is preferred for the chemomechanical polishing performed during fabrication. Additionally, a waveguide fabricated with this orientation displays guided wave modes with low propagation losses. These are several other crystal orientations from which phase modulation can be obtained in a waveguide fabricated from gallium arsenide. Consequently, those skilled in the art will recognize that other orientations can be substituted.

The waveguide dimensions including the length, width and thickness are selected on the basis of the wavelength of infrared laser to be phase modulated. A widely used infrared laser is the $CO_2$ laser that is characterized by narrow laser line widths in the nine to eleven micron wavelength region. The modulator of FIG. 1 which is fabricated according to the present invention is described dimensionally in terms of a broadband traveling wave modulator for a 10.6 micron wavelength $CO_2$ laser. Those skilled in the art will recognize that other infrared lasers operating at different wavelengths may be substituted. Any difference in the laser wavelength may result in changes to the values of the waveguide's dimensions.

In the best mode embodiment, the length of the waveguide is typically on the order of five centimeters and the width on the order of one millimeter. The thickness is on the order of one or two wavelengths of the infrared signal, providing for guided mode propagation of a laser beam. For a 10.6 micron $CO_2$ laser the modulator thickness should be between 10 and 25 microns.

The waveguide's final thickness must be quite uniform so that its top and bottom surfaces are extremely parallel. In the best mode embodiment the waveguide's final thickness should be uniform to within 1 micron. Additionally, metal layer 44 is plated on that portion of the waveguide which abuts the copper base, and comprises a copper layer of 5 microns, although those skilled in the art will recognize that other metal layers, such as one of molybdenum at selected thicknesses can be substituted.

In a process according to the present invention hereinafter detailed in FIG. 5, the wafer is located in a recessed channel in the copper base and is comprised of gallium arsenide although other equivalent materials may be substituted. The wafer provides adequate microwave power dissipation, and as hereinafter detailed in FIG. 3, allows the microstrip network to be fabricated with larger absolute widths at the desired width ratio than would otherwise be possible.

The presence of the buried wafer results in an effective step in the thickness of the waveguide. The step in the thickness causes a perturbation in the microstrip impedance and introduces an additional parasitic shunt capacitance. A reduction in the overall bandwidth of the modulator can be avoided if the step discontinuity presented by the wafer is integrated into the design of transformer 45 and a complementary transformer at the other section of the modulator. FIG. 2 illustrates first transformer 45 comprising contact pad 46 and narrowed section 48. In a modulator fabricated according to the best mode the buried gallium arsenide wafer has a width approximately equal to the width of the first transformer portion of the microstrip network.

In addition, the thickness of the wafer greatly influences the value of the parasitic shunt capacitance. The thickness of the wafer is dependent on the absolute thickness of the waveguide and the selected widths of the impedance transformers and contact pads of the network electrode. For a network electrode having dimensions hereinafter detailed in FIG. 3 and a waveguide thickness of approximately 25 microns a ratio of 10:1 wafer to waveguide thickness is selected. In the best mode embodiment the waveguide has a thickness of approximately 25 microns, yielding a wafer thickness of 250 microns. If, in the modulator of FIG. 1, the thickness ratio is increased beyond 10:1, the wafer shunt capacitance is increased accordingly. Moreover, an increase in insertion loss in the upper frequency range and a reduction in the bandwidth of the modulator is observed.

Metal layer 47, which comprises 5 microns of copper in the best mode of embodiment, is plated to the wafer surface which abuts the copper base.

FIG. 3a contains a planar representation of a microstrip segment 50 of the microstrip network of FIG. 1. The segment comprises first impedance transformer 51 including contact pad 52 and narrowed section 54 as well as comprising microwave impedance transformers 56 and 58 of the modulator of FIG. 1.

Very small device dimensions are a consequence of the need to minimize the amount of the microwave power required for the desired modulation. As a result, the linear portion of the network electrode possesses a characteristic impedance substantially less than the transmission line impedance. The characteristic impedance of the linear portion of the network electrode made according to the present invention is approximately 2.7 ohms. Effective coupling of the microwave energy into the modulator requires that this impedance be matched to the higher transmission line impedance of 50 ohms. The microwave energy can be coupled efficiently provided that several quarter wavelength step impedance transformers are cascaded to match the 50 ohm input impedance and the impedance of the modulator. In a similar fashion, impedance matching must be provided between the modulator and the return path provided by microwave terminal 34 in FIG. 1.

Techniques for designing these broadband microstrip impedance transformers are well known in the art. Moreover, design procedures for broadband microwave transformers have been well established by L. Young in "Table for Cascaded Homogenous Quarterwave Transformers", IRE Transactions, MTT-7, p. 33 (1959). The width of the metal line fabricated on the waveguide determines the impedance thereof. Therefore, the width ratio between transformer sections provides the desired impedance matching.

In the best mode embodiment, contact pad 52 has a width of 0.6 millimeters, and a length of 0.99 millimeters. Impedance transformer 54 has a length of 0.51 millimeters and a width of 0.12 millimeters, transformer 56 has a length of 1.68 millimeters and a width of 0.18 millimeters, and transformer 58 has a length of 1.59 millimeters and a width of 0.6 millimeters. Again note that microstrip network electrode 32 of FIG. 1 of which microstrip segment 50 is a part comprises copper deposited to a thickness of 5 microns and fabricated according to conventional photolithographic techniques or the equivalent thereof.

FIG. 3b is a sectioned illustration of the modulator of FIG. 1 through a portion of microstrip segment 50. FIGS. 3a and 3b together illustrate the position of the microstrip network relative to the modulator components in the best mode. It should be noted that the dimensions and scale have been exaggerated for illustrative purposes.

In FIG. 3b there is illustrated copper base 26, microstrip segment 50, waveguide 22 and dielectric wafer 24. Additionally, included is copper plating 44 disposed to a portion of waveguide surface 62, and copper plating 47 disposed on wafer surface 66.

The wafer surface is plated with approximately 5 microns of copper by techniques known in the art. The waveguide is located in register with the wafer. In addition, the portion of the waveguide surface that abuts the copper base is plated with approximately 5 microns of copper. However, the remaining portion of the waveguide surface which abuts the wafer is uncoated.

As hereinafter detailed in FIG. 5, a bonding substance is used to affix both the wafer to the copper base and the waveguide to the substrate assembly formed by the wafer and copper base. The bonding substance must be chosen in dependence on the modulator's electrical and material characteristics. In the best mode embodiment the bonding substance comprises an epoxy layer such as a thin layer approximately 1 to 2 microns of Epotek 353 ND manufactured by Epoxy Technology Corporation.

FIG. 4 is a perspective illustration of two elements used in the fabrication of the modulator of FIG. 1. Initially a piece of copper is machined to provide copper block 68 having a length and width at least as great as the length and width of the waveguide (22, FIG. 1), and whose thickness is at least as great as the thickness of the gallium arsenide wafer (24, FIG. 1). In the best mode embodiment, the copper block has dimensions 7.3 centimeters by 3.8 centimeters by 0.2 centimeters. Additionally, the copper block includes major surface 70 that is polished to a selected value of optical flatness.

Machined into the major copper block surface is channel 72 positioned lengthwise therein. The channel includes bottom surface 74 and first sidewall 76. The position of the channel relative to a lengthwise edge of the copper block is selected such that the distance is at least as great as the width of the waveguide. Additionally, the width of the bottom surface is selected to be at least as great as the initial width of the wafer. The depth of the channel is chosen in dependence on the desired impedance characteristics of the modulator. In the best mode embodiment, the channel depth is selected to be equal to the final desired thickness of the wafer (24, FIG. 2), and for the modulator of FIG. 1 is 0.23 millimeters.

Gallium arsenide slab 78 formed from a larger ingot to have a crystallographic orientation as indicated hereinabove in FIG. 2. The slab is formed to have a length at least as long as the length of the waveguide and is selected to have an initial width and an initial thickness at least as great as the final thickness and width desired for the modulator. In the best mode embodiment, the wafer has approximate dimensions of 6 centimeters long, 0.4 centimeters wide and 0.05 centimeters thick. Additionally, the slab has first major surface 80 to which five microns of copper is ion beam plated, and second major surface 82 parallel to the first major surface.

A bonding substance is deposited on the channel bottom surface. In the best mode embodiment, the bonding substance comprises a thin layer of Epotek 355 ND epoxy. The thickness of the epoxy layer is approximately one to two microns. The slab is bonded to the copper block such that copper plated major surface 80 of the slab abuts channel bottom surface 74 and the slab abuts the first sidewall.

Figure 5A:
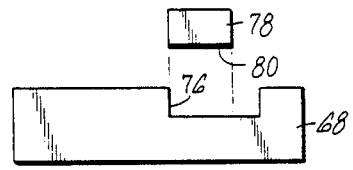
FIG. 5 is an illustration of several steps of a fabrication process according to the present invention.

FIG. 5a is an illustration of the positional relationship between gallium arsenide slab 78 and copper block 68 of FIG. 4 immediately prior to bonding of the slab to the block. Copper plated surface 80 abuts the channel bottom and the slab abuts the first sidewall (76, FIG. 4) of the channel.

Figure 5B:
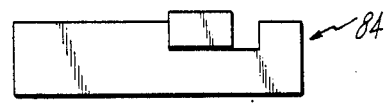

FIG. 5b illustrates assembly 84 formed by the copper block and the slab bonded thereto. Note that the thickness of the slab is at least as great as the depth of the channel. This assembly is mounted by techniques known in the art into a conventional polishing machine, such as a Logitech PP5.

Figure 5C:
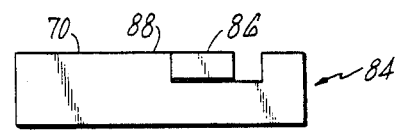

The assembly is then thinned by techniques known in the art, including lapping and polishing, until the gallium arsenide slab surface 86 is coplanar with the copper block surface 70, as illustrated in FIG. 5c. The thickness and uniformity of the slab surface during the thinning is monitored by using a noncontacting air bearing Hoover probe of a type known in the art, such as the Model 155-H manufactured by Ames Mercer. Any wedging in the slab observed can be corrected by adjustments in the thinning machine. The thickness and uniformity of this surface are measured repeatedly during the process. In the best mode embodiment the slab is lapped down to a thickness of 0.023 centimeters with 27 micron grit in a conventional lapping machine such as a Logitech PM-2. Polished slab surface 86 and copper block surface 70 together form hybrid surface 88.

Figure 5D:
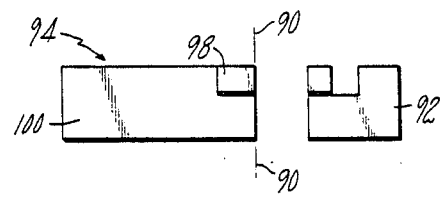

FIG. 5d illustrates the cutting of the assembly into an intermediate configuration. The assembly is cut lengthwise down the channel along plane 90, forming two sections. Section 92 is discarded and the remaining section, comprising the substrate assembly 94 is retained for further processing. The substrate assembly includes GaAs wafer 98 and copper base 100. The width of the gallium arsenide wafer is ultimately dependent on the desired microwave impedance characteristics of the modulator. As detailed hereinabove, the first impedance transformers have a predetermined geometry dependent on the applied microwave power. The width of the gallium arsenide wafer portion of the substrate assembly of FIG. 5d is chosen not to exceed the first transformer length. In the best mode embodiment, a high speed dicing saw known to those skilled in the art is used to cut the assembly. The width of the gallium arsenide is chosen to be 0.152 centimeters.

Figure 5E:

FIG. 5e provides an illustration of the relationship between the substrate assembly of FIG. 5d and the waveguide (22, FIG. 2). As described hereinabove, approximately five microns of copper are plated to that portion of the waveguide surface that is in register with the copper block portion of hybrid surface 88 of the substrate assembly. The portion of the waveguide surface which is in register with the gallium arsenide component of the hybrid surface is unplated.

Figure 5F:
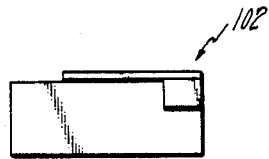

FIG. 5f is an illustration of final modulator structure 102, with the waveguide bonded to the substrate assembly. In the best mode embodiment, the bonding substance is a thin layer of one to two microns of Epotek 353 D whose flatness and uniformity can be assured using techniques known in the art.

After configuring the final modulator structure, the waveguide is thinned by techniques known in the art, including lapping and polishing, to a final selected thickness. In the best mode embodiment, the final modulator structure is mounted in a conventional lapping machine, such as a Logitech PM-2, where the waveguide is lapped to a thickness of 150 microns using 3 micron grit size aluminum oxide slurry on a glass plate. The thickness and uniformity of the waveguide is measured at three points along its length using an IR spectrophotometer such as the Nicolet MX-2 in the reflectance mode with a 0.5 millimeter aperture. A series of fringe like patterns resulting from interference between the reflections from the upper and lower surface is obtained and can be used to calculate the thickness as well as the variation thickness. By iteration any wedging in the waveguide can be corrected, and the waveguide thickness is reduced to 75 microns with a uniformity of 1 micron. Those skilled in the art will recognize that equivalent thickness measurement means may be substituted.

The waveguide is polished chemomechanically using a Buehler Chemomet polishing pad in a dilute 1:10 solution of sodium hypochloride and distilled water. The waveguide thickness is reduced to 50 microns in this manner. The final thinning of the waveguide from 50 microns to 20 microns more or less is accomplished by using ion beam milling techniques known to those skilled in the art.

The microstrip network electrode (32, FIG. 1) is formed on the surface of the waveguide. In the best mode embodiment, the microstrip network is formed using conventional photolithographic techniques, although those skilled in the art will recognize that equivalent methods may be substituted.

The ridge (41, FIG. 1) is subsequently fabricated by techniques known in the art. In the best mode embodiment the ridge is formed by the photolithographic/ion milling method provided by R. A. Wagner and Peter K. Cheo in U.S. Pat. No. 4,169,009 of Sept. 25, 1975 entitled "Large Area Microstructure Processing".

Similarly, although the invention has been shown and described with respect to a best mode embodiment thereof, it should be understood by those skilled in the art that various other changes, omissions and additions thereto may be made therein without departing from the spirit and scope of the invention.

We claim:

1. The method of fabricating a electro-optic modulator for modulating an infrared laser signal at microwave frequencies, comprising the steps of:
   forming a thin film waveguide having a waveguide length and width defining first and second major surfaces;
   forming a dielectric wafer having an initial thickness and an initial width, and having first and second major surfaces;
   plating metal to said wafer first major surface;
   fabricating a metal base with an optically flat surface and a lengthwise channel formed therein, said channel having a bottom surface with a width greater than said wafer initial width and having a depth less than said wafer initial thickness, said depth being selected in dependence on the modulator's electrical characteristics;
   bonding said wafer plated major surface to said channel bottom surface such that the bonded wafer abuts said channel sidewall;
   thinning said bonded wafer until said wafer second major surface is essentially coplanar with said optically flat surface, thereby forming a hybrid surface having metal and dielectric wafer portions thereof;
   cutting said bonded wafer lengthwise along a plane substantially perpendicular to said optically flat surface, to provide a metal base substrate assembly with a dielectric wafer at a final width selected in dependence on the modulator's electrical characteristics;
   plating metal to a first portion of said waveguide first major surface, providing a second portion thereof unplated;
   bonding said waveguide first major surface to said hybrid surface with said unplated second portion in register with said wafer portion of said hybrid surface; and
   fabricating on said waveguide second major surface a ridge with a network electrode having a microstrip in register with said second portion and having launching transformers in register with said first portion.

2. The method of claim 1, wherein the step of forming a thin film waveguide comprises the step of thinning said waveguide to a selected thickness and uniformity.

3. The method of claim 1, wherein said thin film waveguide is formed from gallium arsenide (GaAs).

4. The method of claim 1, wherein said dielectric wafer is formed from gallium arsenide (GaAs).

5. The method of claim 1, wherein said metal base is fabricated from copper.

6. The method of claim 1, wherein said metal comprises molybdenum.

7. The method of claim 1, wherein the step of thinning said bonded wafer additionally comprises the step of iteratively measuring the thickness of said bonded wafer.

8. The method of claim 2, wherein the step of thinning said waveguide further comprises the steps of iteratively measuring the thickness of said waveguide.

9. The method of claim 1, wherein the step of thinning said bonded wafer comprises the steps of:
   lapping said bonded wafer to an initial value of thickness and uniformity,
   polishing said lapped, bonded wafer to a second value of thickness and uniformity.

10. The method of claim 2, wherein the step of thinning said waveguide comprises the steps of
    lapping said waveguide to an initial value of thickness and uniformity,
    polishing said lapped waveguide to second values of thickness and uniformity, and
    ion milling said polished waveguide to a final value of thickness and uniformity.

11. The method of claim 1, wherein said dielectric wafer is bonded to said metal base with an epoxy layer between said plated major surface and said channel bottom surface.

12. The method of claim 1, wherein said waveguide is bonded to said base with an epoxy layer between said plated second portion of said waveguide first major surface and said metal portion of said hybrid suface.

13. The method of claim 1, wherein said step of cutting comprises the step of dice sawing said bonded wafer.

* * * * *

UNITED STATES PATENT AND TRADEMARK OFFICE
CERTIFICATE OF CORRECTION

PATENT NO. : 4,685,988

DATED : August 11, 1987

INVENTOR(S) : Robert A. Wagner and Peter K. Cheo

It is certified that error appears in the above-identified patent and that said Letters Patent is hereby corrected as shown below:

Column 1, line 13, please insert the following paragraph:

-- The invention described herein was made in the performance of work under NASA Contract No. NAS 1-16904 and is subject to the provisions of Section 305 of the National Aeronautics and Space Act of 1958 (72 Stat. 435; 42 U.S.C. 2457).--

Column 4, line 1, "product" should be --produce--.

Column 4, line 68, "These" should be --There--.

Signed and Sealed this

Twenty-first Day of March, 1989

Attest:

DONALD J. QUIGG

*Attesting Officer*     *Commissioner of Patents and Trademarks*